(12) United States Patent
Williams et al.

(10) Patent No.: US 6,502,323 B2
(45) Date of Patent: *Jan. 7, 2003

(54) INTRINSIC GAUGING FOR TUBE FITTINGS

(75) Inventors: Peter C. Williams, Cleveland Heights, OH (US); Lonnie E. Johnston, Aurora, OH (US)

(73) Assignee: Swagelok Company, Solon, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/924,030

(22) Filed: Aug. 7, 2001

(65) Prior Publication Data

US 2001/0047593 A1 Dec. 6, 2001

Related U.S. Application Data

(63) Continuation of application No. 09/395,386, filed on Sep. 13, 1999, now Pat. No. 6,279,242.

(51) Int. Cl.⁷ .............................. G01B 3/00; F16L 35/00; B23Q 17/00
(52) U.S. Cl. .................... 33/501.45; 33/645; 285/93; 411/14
(58) Field of Search .............................. 33/501.45, 613, 33/645, 533; 285/93; 411/10, 11, 14

(56) References Cited

U.S. PATENT DOCUMENTS

| | | | |
|---|---|---|---|
| 2,029,798 A | | 2/1936 | Schellin |
| 2,322,587 A | * | 6/1943 | Payne .......................... 285/93 |
| 3,103,373 A | * | 9/1963 | Lennon et al. ............... 285/342 |
| 3,139,293 A | | 6/1964 | Franck |
| 3,153,974 A | | 10/1964 | Canning |
| 3,287,813 A | * | 11/1966 | Lennon et al. ................. 285/93 |
| 4,127,927 A | * | 12/1978 | Hauk et al. .................... 285/93 |
| 4,162,802 A | | 7/1979 | Cox |
| 4,919,455 A | | 4/1990 | Yoshiro |
| 4,925,217 A | | 5/1990 | Ketcham |
| 5,074,599 A | | 12/1991 | Wirbel et al. |
| 5,134,783 A | | 8/1992 | Perry |
| 5,226,679 A | * | 7/1993 | Klinger ......................... 285/93 |
| 5,280,967 A | | 1/1994 | Varrin, Jr. |
| 5,388,866 A | | 2/1995 | Schlosser |
| 5,441,312 A | | 8/1995 | Fujiyoshi et al. |
| 5,472,242 A | * | 12/1995 | Petersen ........................ 285/93 |
| 6,073,976 A | | 6/2000 | Schmidt et al. |
| 6,279,242 B1 | * | 8/2001 | Williams et al. ......... 33/501.45 |

FOREIGN PATENT DOCUMENTS

| | | |
|---|---|---|
| DE | 44 13 595 A1 | 10/1995 |
| EP | 0 863 354 A | 9/1998 |
| EP | 0 903 529 A2 | 3/1999 |
| GB | 1361372 | 7/1974 |
| GB | 2 120 795 A | 12/1983 |
| GB | 2 115 940 B | 10/1985 |
| GB | 2 225 073 B | 5/1990 |
| GB | 2 049 853 A | 12/1998 |
| JP | 01295015 A | 11/1989 |
| JP | 05280520 A | 10/1993 |
| JP | 7243564 | 9/1995 |

OTHER PUBLICATIONS

PCT US/00/24900 International Search Report.

* cited by examiner

Primary Examiner—Christopher W. Fulton
(74) Attorney, Agent, or Firm—Calfee, Halter & Griswold, LLP

(57) ABSTRACT

An intrinsic gauging device for a ferrule type tube fitting of the type having a coupling nut, a coupling body and at least one ferrule, includes a precisely formed marking on the coupling body that is visually perceptible when the coupling is in a finger tight position, and that is covered or visually imperceptible or otherwise has a predetermined relationship with the coupling nut when the fitting has been initially pulled-up. In a preferred form, the marking is realized as a precision groove or recess machined into a surface of the coupling body. The groove can be made more easily visually perceptible such as by roughening or knurling the surface, or coloring the surface, for example. The groove defines an edge at a precise position that corresponds to a predetermined axial displacement of the nut relative to the body for initial pull-up. The marking may also be formed with a precise dimension such as an axial length to provide a second edge that corresponds to a predetermined axial displacement of the nut relative to the body beyond initial pull-up for fitting assemblies that are remade.

20 Claims, 1 Drawing Sheet

INTRINSIC GAUGING FOR TUBE FITTINGS

RELATED APPLICATIONS

This application is a continuation of U.S. patent application Ser. No. 09/395,386 filed on Sep. 13, 1999 for INTRINSIC GAUGING FOR TUBE FITTINGS, now U.S. Pat. No. 6,279,242 B1, the entire disclosure of which is fully incorporated herein by reference.

TECHNICAL FIELD OF THE INVENTION

The present invention relates to tube fittings of the type that use one or more ferrules for gripping a tube end. More particularly, the invention relates to an intrinsic gauging apparatus and method for visual verification that the fitting has been properly pulled up.

BACKGROUND OF THE INVENTION

Ferrule-type tube fittings are well known in the art. A two ferrule fitting that has been highly successful for over 30 years is a sequential gripping arrangement invented by Lennon, et al., U.S. Pat. No. 3,103,373, the entire disclosure of which is fully incorporated herein by reference.

In a typical ferrule-type tube fitting assembly there is a coupling arrangement that includes a coupling body and a coupling nut that is threadably engaged with threads on one end of the coupling body. The coupling body includes a torquing flange, typically in the form of a hex shaped flange. The coupling body at the other end may be joined to or integral with another body, flow control device and so on. The coupling body includes an axially tapered opening or camming mouth and a shoulder or stop axially spaced from the tapered opening. Two gripping components or ferrules, including a rear ferrule and a front ferrule, are positioned within the coupling nut and are interposed between the coupling body and the coupling nut. The tapered front end of the front ferrule initially engages the camming mouth of the coupling body and a tapered front end of the rear ferrule initially engages a camming surface at the back end of the front ferrule. The coupling nut has a shoulder that drivingly engages a back wall of the rear ferrule. A tube end is axially inserted into the fitting until the tube end abuts the inner shoulder stop of the coupling body. Upon relative rotation of the coupling body and nut which drives the coupling components axially towards each other, the tapered ferrules are axially pulled together, commonly referred to in the art as being "pulled-up", and radially displaced inwardly to cause a sequential inward gripping of the tube. The ferrules tightly grip the tube wall due to the swaging action.

Typically, a tube fitting assembly such as described above, is shipped to a customer in an assembled condition with the ferrules installed in the coupling nut and the coupling nut threaded onto the coupling body to a finger tight condition. The assembler then slips a tube end axially into the fitting until it bottoms or abuts the inner stop shoulder on the coupling body. With the fitting in an initial finger tight condition, the assembler, using a wrench or spanner or the like for example, then imparts a relative rotation between the coupling body and the coupling nut for a predetermined rotation to complete the installation. For smaller tube fittings, for example tube fittings used on one-quarter (¼) to one (1) inch tubing, there is typically a relative rotation of one and a quarter "turns past finger tight" ("TPFT") position to achieve proper initial pull-up.

The number of turns to properly pull-up a fitting assembly is determined by a number of factors including the thread pitch and the proper axial displacement of the coupling nut relative to the coupling body to insure that the ferrules are properly swaged onto the tube wall. Although the various parts of the fitting are machined with high precision and assembled to a finger tight position, it still can be difficult to keep track of the number of rotations and fractions thereof to pull-up the fitting. Many times the fitting is being installed in an area with limited clearance for the wrench, thus necessitating a number of separate wrenching operations for one complete rotation.

A successful and commonly used solution to verifying proper pull-up is a NO-GO gauge as described in U.S. Pat. No. 3,287,813 to Lennon et al., the entire disclosure of which is fully incorporated herein by reference. This gauge effectively verifies that the gap or relative spacing between the coupling body flange and the forward end of the coupling nut is of the correct dimension. The assembler first imparts the required relative rotation between the coupling nut and body. If the gauge cannot fit between the body and the coupling nut, the assembler knows that the nut has at least been properly pulled-up.

Although the gauging tool described above continues to enjoy excellent commercial success and use, there are applications where the use of the gauge may be an inconvenience. Of particular interest is the need for a gauge that does not necessarily require a separate gauge tool, but rather could be intrinsically part of the fitting.

Additionally, the NO-GO gauge is used principally for initial pull-up of the fitting assembly. In some cases, a coupling may be disassembled by unthreading the coupling nut from the body for repair or replacement of the device joined to the tube end. During remake of the fitting, typically the relative rotation between the coupling nut and body requires fractionally more turns than is required for initial pull-up, or in other words the axial displacement of the coupling nut towards the coupling body is slightly greater each pull-up compared to the previous pull-up operation. A manufacturer may determine a recommended number of remakes based on various design factors and empirical data to limit the axial displacement of the coupling nut with respect to the coupling body to a predetermined amount beyond the initial pull-up axial displacement. The design factors taken into consideration may include the pressure and temperature ratings for the fitting, the materials used in the tubing and the fitting components and so on.

The actual number of remakes a given fitting assembly can actually undergo and still exhibit acceptable performance characteristics may be significantly higher than the recommended number of remakes, but it is still desirable in some cases to be able to provide an indication to the assembler that the fitting assembly has been remade a number of times so as to have advanced the coupling nut and body together a predetermined axial displacement beyond initial pull-up. Since the hand gauge discussed above necessarily has a fixed axial dimension, it is not useful for verifying remade fittings.

It is therefore an objective of the present invention to an intrinsic gauging device and method for verifying proper pull-up of a ferrule-type tube fitting for initial pull-up. It is another objective to provide an intrinsic gauging device and method that verifies proper initial pull-up and also can be used to provide an indication that the fitting has been remade a number of times so as to indicate a predetermined axial displacement of the coupling nut relative to the coupling body.

SUMMARY OF THE INVENTION

To the accomplishment of the aforementioned and other objectives, and in accordance with one embodiment of the invention, an intrinsic gauging device includes a precisely formed and positioned marking on the coupling body that is visually perceptible when the coupling is in a finger tight position, and that is covered or visually imperceptible when the fitting has been properly pulled-up. In a preferred form, the marking is realized as a precision groove or recess machined into a surface of the coupling body. The groove can be made more visually perceptible such as by roughening or knurling the surface, or coloring the surface, for example. Use of the intrinsic gauge thus avoids the need to count or remember the number of relative rotations and fractional rotations imparted to the coupling nut and body. The position of the marking corresponds to a predetermined axial displacement of the coupling nut relative to the coupling body for initial pull-up.

The invention further contemplates the methods embodied in the use of such an intrinsic gauging device, as well as in another embodiment, a method for gauging proper pull-up of a coupling nut on a coupling body in a ferrule type fitting, the method including the steps of positioning a visually perceptible marking on the coupling body; forming the marking with an axial length that corresponds to a predetermined axial displacement of the coupling nut relative to the coupling body; assembling the fitting to a finger tight condition; and tightening the coupling nut onto the coupling body until the marking is just hidden from view by the nut.

In accordance with another aspect of the invention, the marking may be formed with a predetermined axial dimension and precisely located on the coupling body so that upon proper initial pull-up the coupling nut aligns with a leading edge of the marking; and upon a predetermined additional axial displacement of the coupling nut relative to the coupling body during subsequent remakes, the nut covers the marking or aligns with a trailing edge of the marking.

These and other aspects and advantages of the present invention will be apparent to anyone skilled in the art from the following description of the preferred embodiments in view of the accompanying drawings.

BRIEF DESCRIPTION OF THE DRAWINGS

The invention may take physical form in certain parts and arrangements of parts, preferred embodiments and a method of which will be described in detail in this specification and illustrated in the accompanying drawings which form a part hereof, and wherein.

DETAILED DESCRIPTION OF THE PREFERRED EMBODIMENTS

Figure 1:
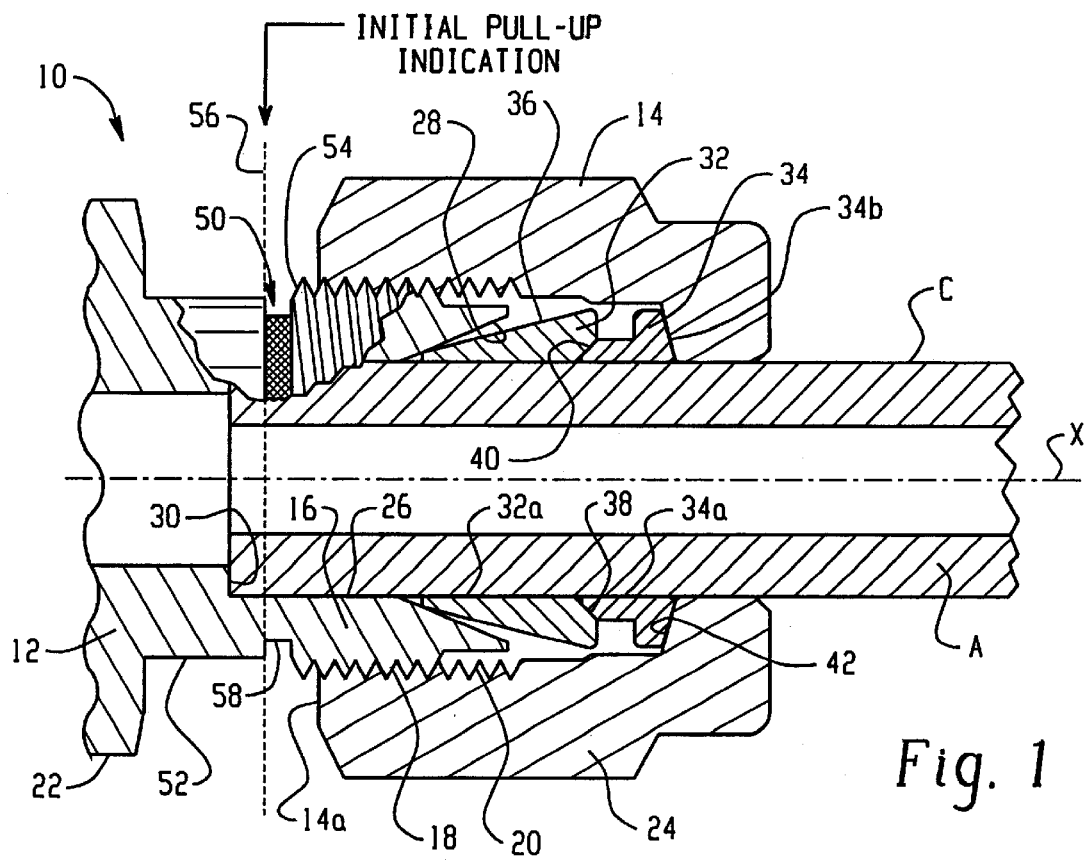
FIG. 1 is a ferrule-type fitting that incorporates an intrinsic gauge feature in accordance with the invention, the fitting being shown in longitudinal cross-section in a finger tight position.

With reference to FIG. 1, the invention will be described herein in an exemplary manner as being incorporated into a standard two ferrule style tube fitting assembly. However, this description is intended to be exemplary in nature to explain and illustrate the concepts and advantages of the present invention, and therefore should not be construed in a limiting sense. Persons of mere ordinary skill in the art will readily understand and appreciate that the invention can be put to practice in a wide variety of tube fittings and couplings that utilize two components that are relatively rotated to make up the assembly. For example, and not for purposes of limitation, the present invention can conveniently be used in a single ferrule tube fitting or with any two part coupling in which proper assembly is determined in part by accurate relative rotation between two threaded parts.

The standard fitting assembly 10 includes a coupling body 12 and a coupling nut 14. The coupling body 12 includes a first end 16 that is externally threaded as at 18. The coupling nut is internally threaded as at 20 and the nut 14 can be easily installed on the coupling body 12 by relative rotation between the body 12 and the nut 14. The term "relative" rotation is used herein because although a typical assembly procedure for the fitting 10 involves restraining the body 12 against rotation and turning the nut 14 with a wrench, such a procedure is not required to practice the present invention. It is contemplated that the body 12 could be rotated while holding the nut 14 stationary, or alternatively, rotational movement could be applied to both the nut and body to rotate them in opposite directions at the same time to make up the fitting 10. The body and nut are typically provided with hex shaped portions 22, 24 respectively to assist in the use of a wrench or other tool to impart the relative rotation.

The threaded end 16 of the body 12 has a central bore or passageway 26 that extends longitudinally all the way through the coupling body 12. This bore 26 is formed with a tapered camming mouth 28 at the forward end of the coupling body 12. The coupling body 12 includes an inner shoulder 30 such as a counterbore that is axially spaced from the camming mouth 28.

The fitting assembly 10 further includes a front ferrule 32 and a rear ferrule 34. The front ferrule 32 has a tapered nose portion 36 that engages the tapered camming mouth 28 of the coupling body 12. The front ferrule 32 also is formed with a tapered camming mouth 38 at the back end thereof. The rear ferrule 34 includes a tapered nose portion 40 that engages the tapered camming mouth 38 of the front ferrule 32. All of the fitting 10 components are commercially available from Swagelok Company, Solon, Ohio.

The fitting assembly 10 is illustrated in FIG. 1 in the "finger tight position" or FTP as the fitting would typically be received from the manufacturer. The drawing also illustrates the fitting 10 after a tube end A has been inserted into the fitting 10. Since the coupling components 12, 14 are only finger tight, the tube end A easily slides into the fitting assembly 10 until the tube end wall B abuts the inner shoulder 30 of the coupling body 12. The front and rear ferrules 32, 34 both have generally cylindrical bores 32a and 34a respectively that are closely received about the tubing outer wall C.

It is important to note that the present invention is not limited to the ferrule geometry illustrated in the drawings. Many different ferrule configurations can be used with the present invention.

The coupling nut 14 includes an inwardly extending shoulder 42 that serves as a driving surface that engages the back wall 34b of the rear ferrule 34. As the coupling nut 14 is tightened down onto the coupling body 12, the rear ferrule 34 is driven forward into the camming mouth at the back end of the front ferrule 32 and a sequential gripping operation takes place as described in the above referenced patents to cause inward radial displacement of the ferrules 32, 34 to swage them into a strong and fluid tight grip on the tube wall C (see FIG. 2).

The relative axial displacement of the coupling nut 14 onto the coupling body 12 is related to the number of complete and fractional relative rotations between the body 12 and the nut 14. The nut 14 is advanced far enough relative to the body 12 to impart a strong gripping action by the ferrules 32, 34 on the tube wall C. Accordingly, a typical assembly instruction would indicate the number of full and fractional turns to impart, for example, to the coupling nut 14 while holding the coupling body 12 stationary.

As technology advances in the materials and design of the fitting 10 components, the torque needed to make up the fitting 10 tends to decrease. For example, this decrease in make-up torque can result from improvements that reduce galling between the nut 14 and the rear ferrule 34. Whatever the reason may be, reduced torque makes it easier for an assembler to inadvertently advance the nut 14 axially beyond the point sufficient for initial pull-up of the fitting 10. Over advancing the nut 14 relative to the body 12 beyond this point is typically accommodated by the fitting design due to the desirability in some applications to permit remakes. However, such over advancing of the nut 14 onto the body 12 during initial pull-up reduces the additional relative axial displacement available for subsequent remakes, which thus in turn reduces the available number of remakes.

In accordance with a feature of the invention, an intrinsic gauging device is provided on the coupling body 12. By "intrinsic gauging" is simply meant that the gauge device and/or function or methodology is inherently embodied in one or more of the fitting components and therefore can be used without any external or separate gauging tool. In the preferred but not required form, the intrinsic gauge is realized as a precisely positioned visually perceptible marking on the coupling body 12. In this exemplary embodiment, the marking is a precision machined groove or recess 50 formed in the coupling body neck 52. More preferably, the groove 50 is positioned adjacent to or near the end thread 54 of the threaded body 12. The groove 50 has a leading edge 50a and a trailing edge 50b. The groove 50 is visually perceptible to an assembler when the fitting is in the FTP as illustrated in FIG. 1. The groove 50 is preferably but again not necessarily circumferential. Alternatively, the groove 50 could be formed in arcuate sections about the body neck 52. Virtually any geometric shape could be machined into the body 12 to form the marking 50 so long as it has a well defined and visually perceptible edge or edges or other suitable demarcation, as will be apparent from the following discussion.

Figure 2:
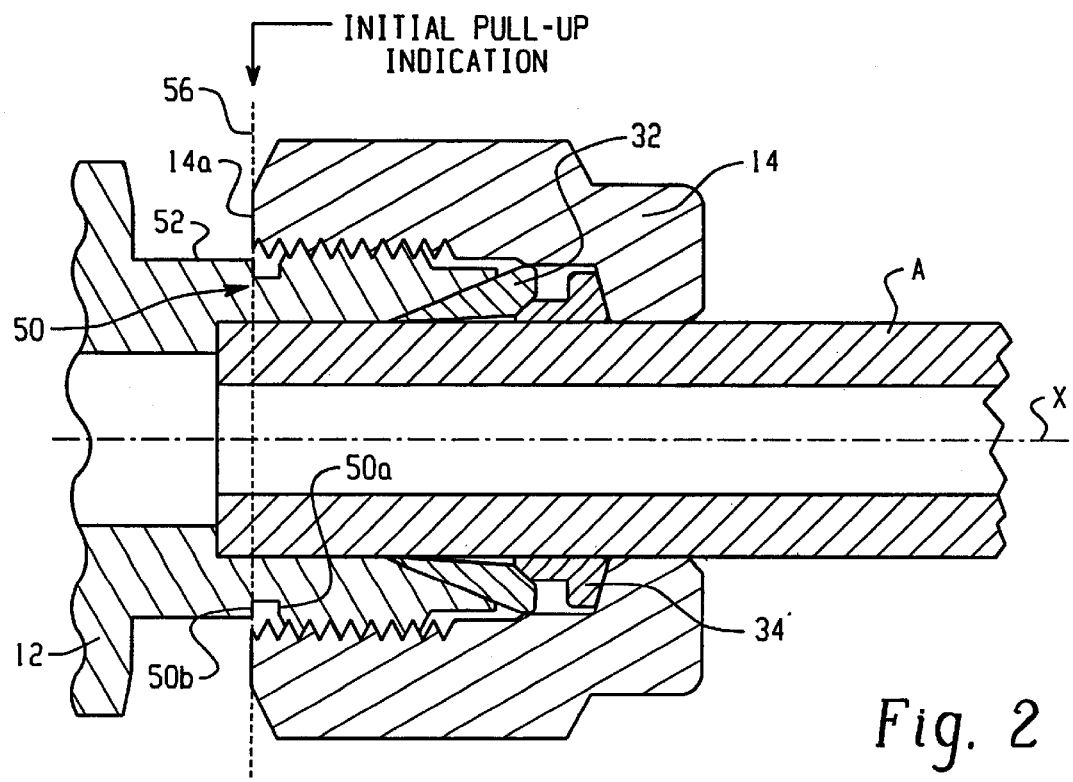
FIG. 2 is the fitting of FIG. 1 shown in a proper pulled-up condition.

The axial position 56 of the trailing edge 50b of the groove 50 is precisely machined so that when the fitting 10 has been properly and initially pulled-up, as illustrated in FIG. 2, the coupling nut forward end 14a substantially aligns with the edge 50b and the nut 14 substantially obstructs visual perception of the groove 50, particularly from a lateral viewing angle relative to the longitudinal axis X of the fitting 10. The precise location and positioning of the trailing edge 50b is used as a marker so that the assembler can pull-up the fitting 10 by advancing the coupling nut 14 relative to the coupling body 12 to the proper initial position, referred to herein as the "predetermined initial pull-up". This predetermined initial pull-up condition corresponds to a predetermined initial axial position of the nut 14 relative to the body 12 for initial pull-up to swage the ferrules 32, 34 onto the tube wall C. To aid in the visual perception of the groove 50 before the assembly is in the pulled-up condition, the groove 50 can be colored as by applying a paint or other coloring material to the visually perceptible surface, such as the bottom groove surface 58. For example, an adhesive strip with a suitable color can be placed in the groove 50. Still further, the groove surface 58 could be knurled or otherwise changed in texture or appearance to be easily seen to the human eye. Further still, a snap ring may be installed into the groove 50.

Still as another alternative to forming a groove 50, a machined band could be formed in or on the neck 52, such as again by knurling, stippling, roughening and so forth.

For the initial pull-up gauging aspect of the invention, the use of a groove improves visual perception of the edge 50b. Those skilled in the art will readily appreciate that the marking 50 may be realized in the form of any suitable edge, line or other demarcation either raised or recessed in the coupling body 12 that is visually perceptible during pull-up to indicate to the assembler that the predetermined initial pull-up position has been reached and therefore further advancing of the nut 14 is no longer required. Of course, the assembler can still rotate the nut 14 past this position, but in any case the intrinsic gauge has provided the indication that the nut 14 has been pulled up to at least the initial pull-up position.

As an exemplary assembly procedure and method for intrinsic gauging, the assembler installs the tube end A into the fitting. Using a wrench or other suitable tool the coupling body 12 is held stationary and the coupling nut 14 rotated until the marking 50 is just obstructed from view. For embodiments that use a simpler demarcation for the marking 50, the nut 14 is rotated until the edge 14a of the nut substantially aligns with the marking 50. Therefore, with the present invention there is no need to count or keep track of the number of complete and fractional relative rotations between the body 12 and the nut 14.

For fittings 10 that will be made and remade, the leading edge 50a can also be precisely axially positioned so that in the FTP the leading edge 50a will be axially spaced from the forward end 14a of the nut 14. The leading edge 50a is positioned such that when the proper pull-up has been effected, the forward end 14a of the nut 14 aligns with the leading edge 50a. During subsequent remakes, the nut 14 advances a little further each time to achieve proper pull up. After a predetermined number of remakes the forward end 14a of the nut 14 aligns with the trailing edge 50b of the marking 50, thereby substantially covering the marking 50, and the assembler knows that the fitting 10 has been remade to the point where the coupling nut 14 has been axially advanced a predetermined amount relative to the coupling body 12 past the initial pull-up condition. The axial length between the leading and trailing edges 50a, 50b of the marking 50 can be determined from design analysis and empirical data so that the marking 50 becomes covered by the nut 14 after a number of remakes that corresponds to a predetermined advance of the coupling nut 14 relative to the coupling body 12 beyond the predetermined initial pull-up position.

Regardless of its form, the marking 50 can be precisely machined based on the machining profile of the body 12 so that the marking provides an accurate and permanent visually perceptible indicia for determining proper pull-up of the fitting 10.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. Intrinsic gauging assembly for a ferrule type tube fitting, comprising:

a coupling body having a threaded end that is capable of receiving a tube end;

a threaded coupling nut that mates with said threaded end of the coupling body;

at least one ferrule retained in the nut interior; and a visually perceptible marking on the coupling body that is visible when the fitting is in a finger tight condition, and that is substantially imperceptible after the fitting has been assembled on a tube end to an initial pull-up position, wherein said marking comprises a recess formed in said coupling body; said recess having a leading edge and a trailing edge wherein said trailing edge corresponds to a predetermined axial displacement of said nut relative to said body during an initial pull-up of the assembly; said trailing edge further corresponding to a predetermined initial pull-up position beyond which said nut can be further advanced during subsequent remakes of the assembly.

2. The assembly of claim 1 wherein said recess comprises a machined surface on the coupling body.

3. The assembly of claim 2 wherein said recess is adjacent said threaded end of the coupling body.

4. The assembly of claim 2 wherein said machined surface is knurled.

5. The assembly of claim 1 wherein said marking has an axial position that corresponds to a predetermined axial advance of the coupling nut relative to the coupling body for indicating proper initial pull-up.

6. The assembly of claim 1 wherein said marking comprises a machined recess in a neck portion of said coupling body.

7. The assembly of claim 1 wherein said recess comprises a band having a predetermined axial length.

8. The assembly of claim 1 wherein said recess comprises a colored machined groove.

9. The assembly of claim 1 wherein said marking comprises a demarcation that is axially positioned on said body and corresponds to a predetermined axial displacement of said nut relative to said body for initial pull-up.

10. The assembly of claim 9 wherein said demarcation comprises an edge that substantially aligns with a forward end of said coupling nut when the nut has been axially displaced relative to the body by said predetermined axial displacement for initial pull-up.

11. The assembly of claim 9 wherein said demarcation is substantially obstructed from view after the nut has been axially displaced relative to the body by at least said predetermined displacement for initial pull-up.

12. Intrinsic gauge for a ferrule type tube fitting assembly, comprising:

a coupling body having a threaded end that can receive a tube end and at least one ferrule and that can be mated with a coupling nut as a fitting assembly;

said coupling body having a groove thereon that is visible when the fitting assembly is in a finger tight condition, and that has a predetermined relationship to the coupling nut when the fitting assembly has been properly pulled up on a tube end; said groove corresponding to a predetermined axial displacement of the nut relative to the body for initial pull-up with an additional axial displacement beyond said predetermined axial displacement for initial pull-up during at least one subsequent remake of the assembly.

13. The assembly of claim 12 wherein said groove comprises a machined surface on the coupling body.

14. The assembly of claim 13 wherein said surface is adjacent a back end of said threaded end of the coupling body.

15. The assembly of claim 13 wherein said machined surface is knurled.

16. A method for gauging proper pull-up of a coupling nut on a coupling body in a ferrule type fitting, comprising the steps of:

a. forming a visually perceptible groove on the coupling body;

b. said forming step comprising positioning a trailing edge of said groove to correspond to a predetermined axial displacement of the coupling nut relative to the coupling body for initial pull-up; and c. assembling the coupling nut onto the coupling body until the marking corresponds with the nut; wherein said groove is perceptible prior to initial pull-up and substantially imperceptible after proper initial pull-up; and wherein d. said coupling nut can be axially advanced beyond said predetermined axial displacement for initial pull-up.

17. The method of claim 16 wherein the step of forming the groove comprises the step of machining said groove in the coupling body.

18. The method of claim 17 wherein the step of forming the marking comprises the step of applying a color surface to said groove.

19. The method of claim 17 wherein the step of forming the marking comprises the step of knurling the surface of said groove.

20. The method of claim 17 comprising the step of imparting relative rotation between the nut and body to produce an axial displacement of the nut relative to the body until said marking is substantially visually obstructed.

\* \* \* \* \*